(12) United States Patent
Bahr et al.

(10) Patent No.: US 11,424,794 B1
(45) Date of Patent: *Aug. 23, 2022

(54) METHODS AND SYSTEMS FOR WIRELESS COMMUNICATION IN A REFLECTIVE ENVIRONMENT

(71) Applicant: Cable Television Laboratories, Inc., Louisville, CO (US)

(72) Inventors: John C. Bahr, Superior, CO (US); Thomas J. Ellis, Dallas, TX (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/120,624

(22) Filed: Dec. 14, 2020

Related U.S. Application Data

(63) Continuation of application No. 16/402,476, filed on May 3, 2019, now Pat. No. 10,868,592.

(60) Provisional application No. 62/666,245, filed on May 3, 2018.

(51) Int. Cl.
| | |
|---|---|
| *H04B 7/0456* | (2017.01) |
| *H01Q 15/14* | (2006.01) |
| *H01Q 3/26* | (2006.01) |
| *H04B 7/01* | (2006.01) |
| *H01Q 21/22* | (2006.01) |

(52) U.S. Cl.
CPC ......... *H04B 7/0469* (2013.01); *H01Q 3/2694* (2013.01); *H01Q 15/14* (2013.01); *H01Q 21/22* (2013.01); *H04B 7/01* (2013.01)

(58) Field of Classification Search
CPC .......... H04B 7/01; H04B 7/0469; H04B 7/10; H01Q 15/14; H01Q 21/065; H01Q 21/22; H01Q 21/24; H01Q 19/17
See application file for complete search history.

(56) References Cited

U.S. PATENT DOCUMENTS

| | | | |
|---|---|---|---|
| 6,317,098 B1 * | 11/2001 | Andrews | H01Q 21/24 |
| | | | 342/361 |
| 10,439,443 B1 | 10/2019 | Alfarra et al. | |
| 2003/0162566 A1 * | 8/2003 | Shapira | H04B 7/10 |
| | | | 455/561 |
| 2006/0232467 A1 | 10/2006 | Small | |
| 2011/0317595 A1 | 12/2011 | Kanda et al. | |
| 2012/0086606 A1 | 4/2012 | Mathews et al. | |
| 2013/0060496 A1 * | 3/2013 | Narita | H02J 50/20 |
| | | | 702/62 |

(Continued)

*Primary Examiner* — Khanh C Tran
(74) *Attorney, Agent, or Firm* — PdZ Patent Law, PLLC

(57) ABSTRACT

A method for wireless communication in a reflective environment includes (a) receiving first wireless signals at a first antenna assembly at least partially via a first reflective environment, (b) generating a first electrical signal from a first antenna element of the first antenna assembly in response to the first wireless signals, the first antenna element having a first polarization, (c) generating a second electrical signal from a second antenna element of the first antenna assembly in response to the first wireless signals, the second antenna element having a second polarization different from the first polarization, (d) shifting phase of at least one of the first electrical signal and the second electrical signal, and (e) after shifting phase, combining at least the first electrical signal and the second electrical signal to generate a combined electrical signal.

17 Claims, 11 Drawing Sheets

(56) References Cited

U.S. PATENT DOCUMENTS

2014/0044042 A1    2/2014  Moshfeghi
2015/0236429 A1*   8/2015  Tanabe ................ H01Q 15/246
                                                          455/73
2017/0346179 A1*  11/2017  Wu ..................... H01Q 9/0414

* cited by examiner ously incorporated by reference.

METHODS AND SYSTEMS FOR WIRELESS COMMUNICATION IN A REFLECTIVE ENVIRONMENT

RELATED APPLICATIONS

This application is a continuation of U.S. patent application Ser. No. 16/402,476, filed on May 3, 2019, which claims benefit of priority to U.S. Provisional Patent Application Ser. No. 62/666,245, filed on May 3, 2018. Each of the aforementioned patent applications is incorporated herein by reference.

BACKGROUND

Wireless data transmission is widely used in communication systems. For example, Wi-Fi communication systems wirelessly transmit data between a Wi-Fi base station and a client device. As another example, cellular telephone systems wirelessly transmit data between a cellular base station and a client device.

DETAILED DESCRIPTION OF THE EMBODIMENTS

Figure 1:
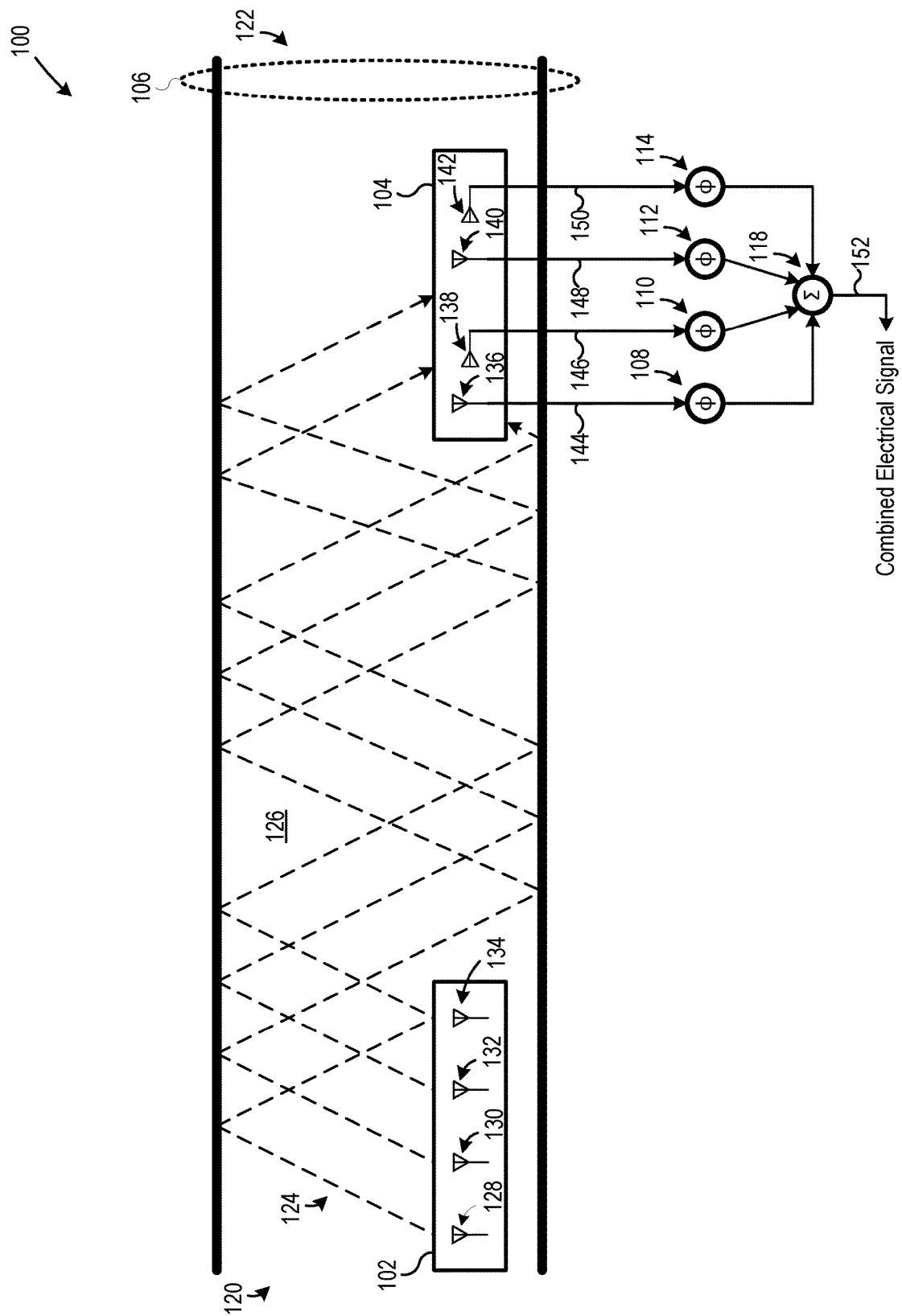
FIG. 1 is a schematic diagram illustrating a system for wireless communication in a reflective environment, according to an embodiment.

While wireless data transmission offers many benefits, wireless signals may be blocked or attenuated by objects. For example, a Wi-Fi base station in a building many be unable to communicate with client devices in some parts of the building due to walls and/or ceilings of the building blocking transmission of wireless signals between the Wi-Fi base station and the client devices. As another example, a cellular base station located outside of a building may be unable to communicate with client devices within the building due the building's envelope (e.g. roof and walls) blocking transmission of wireless signals between the cellular base station and the client devices within the building.

One possible solution to these problems is to provide additional wireless base stations. For example, multiple Wi-Fi base stations may be provided within a building to reduce the need for wireless signals to penetrate walls and/or ceilings when traveling between a Wi-Fi base station and a client device. As another example, a small cellular base station, sometimes referred to as a "pico cell," may be placed in a building, to eliminate the need for a client device in the building to communicate with a cellular base station outside of the building.

However, providing additional wireless base stations has drawbacks. For example, it can be difficult, or even essentially impossible, to provide backhaul for additional wireless base stations. For example, a building may be constructed in a manner which makes it difficult to run Ethernet backhaul cables to some portions of the building. Additionally, providing additional wireless base stations may be costly, due to both hardware cost and installation labor cost.

Many buildings include reflective conduits which could potentially be used to transmit wireless signals to different portions of the building, thereby reducing, or even eliminating, the need for additional wireless base stations. For example, buildings often include extensive duct work for carrying air to different portions of the building, such as for heating, cooling, and/or ventilation. These ducts are frequently constructed of sheet metal which is highly reflective to wireless signals, and the ducts could therefore serve as a conduit for wireless signals. Some other environments, such as tunnels or urban street corridors, may also be highly reflective to wireless signals and therefore capable of serving as wireless signal conduits.

Applicant has determined that certain configurations of a receiving antenna and/or a transmitting antenna in a reflective environment may help achieve robust wireless communication. For example, Applicant has determined that a polarized wireless signal may become substantially depolarized when traveling through a reflective environment, and conversion of the wireless signal to an electrical signal can therefore be maximized by using a dual-polarized receiving antenna assembly. As another example, a transmitting antenna can be controlled to adjust magnitude and/or phase of wireless signals to exploit polarization effects of a reflective transmission environment, thereby helping maximize capture of the wireless signals by a receiving antenna. Disclosed herein are methods and systems for wireless communication in a reflective environment which incorporate one or more of these principles to promote robust wireless communication.

FIG. 1 is a schematic diagram illustrating a system 100 for wireless communication in a reflective environment. System 100 includes an antenna assembly 102, an antenna assembly 104, a reflective conduit 106, a phase shifting device 108, a phase shifting device 110, a phase shifting device 112, a phase shifting device 114, and a combining device 118. In certain embodiments, antenna assemblies 102 and 104 are part of a Wi-Fi wireless communication system (e.g., a scheduled, a partially scheduled, or an unscheduled system), a long-term evolution (LTE) wireless communication system, a fifth-generation (5G) new radio (NR) wireless communication system (e.g. licensed or unlicensed), a sixth-generation (6G) wireless communication system, or variations and/or extensions thereof.

In some embodiments, reflective conduit 106 is a metal duct, such as a metal duct having a circular cross-section or a rectangular cross-section. Although FIG. 1 illustrates reflective conduit 106 as being straight, reflective conduit 106 could form one or more turns without departing from the scope hereof. Additionally, reflective conduit 106 could be modified to include multiple branches or reflective environments, such as discussed below with respect to FIG. 7. In some other embodiments, reflective conduit 106 is a tunnel or a structure at least partially formed by one or more buildings and/or other man-made or natural objects. Although reflective conduit 106 is illustrated in cross-sectional view in FIG. 1 to show features within the conduit, it is anticipated that reflective conduit 106 will be completely or partially enclosed except at ends 120 and 122.

Antenna assembly 102 and antenna assembly 104 are disposed such that reflective conduit 106 at least partially provides a path for wireless signals 124 between the two antenna assemblies. In some embodiments, antenna assembly 102 and antenna assembly 104 are disposed within reflective conduit 106, such as illustrated in FIG. 1. However, one or more of antenna assembly 102 and antenna assembly 104 may be located outside of reflective conduit 106, as-long-as the antenna assemblies are in radio-frequency (RF) communication with each other via reflective conduit 106.

Antenna assembly 102 includes antenna elements 128, 130, 132, and 134 which are configured to generate wireless signals 124 in response to one or more electrical signals (not shown) encoded with information to be transmitted by wireless signals 124. The number of antenna elements in antenna assembly 102 may be varied without departing from the scope hereof. For example, antenna assembly 102 could include as few as one antenna element, or antenna assembly 102 could be modified to have tens, hundreds, thousands, or even more, antenna elements. In some embodiments, antenna elements 128, 130, 132, and 134 are driven by a common electrical signal, and in some other embodiments, two or more antenna elements 128, 130, 132, and 134 may be driven by different respective electrical signals, such as to enable individual control of the antenna elements. Antenna assembly 102 could include additional elements, such as electronics for driving antenna elements 128, 130, 132, and 134, without departing from the scope hereof. Although antenna elements 128, 130, 132, and 134 are symbolically shown as having a common polarization, two or more antenna elements could have different respective polarizations. Additionally, two or more antenna elements 128, 130, 132, and 134 could share one or more respective components without departing from the scope hereof.

FIG. 1 symbolically shows wireless signals 124 generated by antenna assembly 102 as dashed lines being reflected by walls of reflective conduit 106. FIG. 1, however, is not intended to specify any particular path of wireless signals 124 through reflective conduit 106. To the contrary, it is anticipated that the actual path of wireless signals 124 through reflective conduit 106 will significantly vary from application-to-application, as well as based on operating conditions. The reflection of wireless signals 124 by reflective conduit 106 may cause wireless signals 124 to be significantly depolarized when the wireless signals reach antenna assembly 104. For example, if wireless signals 124 generated by antenna assembly 102 have a predominately vertical polarization near end 120 of reflective conduit 106, the wireless signals may have substantially equal orthogonal polarizations at end 122 of reflective conduit 106, due to multiple reflections of wireless signals 124 within reflective conduit 106.

Antenna assembly 104 is at a multi-polarized antenna assembly, i.e. antenna assembly 104 includes antenna elements having at least two different polarizations. For example, in some embodiments, antenna assembly 104 is a dual-polarized antenna assembly including antenna elements with horizontal polarization and antenna elements with vertical polarization. The multi-polarization of antenna assembly 104 advantageously enables system 100 to capture wireless signals 124 having multiple polarizations, thereby helping maximize portion of wireless signals 124 captured by antenna assembly 104. If antenna assembly 104 instead had a single polarization, a significant portion of wireless signals 124 might not be captured by antenna assembly 104 due to the effective de-polarization of wireless signals 124 by reflective conduit 106.

Antenna assembly 104 includes antenna elements 136, 138, 140, and 142. At least two of antenna elements 136, 138, 140, and 142 have different respective polarizations. For example, in the FIG. 1 illustration, antenna elements 136 and 140 have a vertical polarization, and antenna elements 138 and 142 have a horizontal polarization, although the antenna element polarization configuration of antenna assembly 104 could vary. The number of antenna elements in antenna assembly 104 may be varied without departing from the scope hereof as long as antenna assembly 104 includes at least two antenna elements with different respective polarizations. Antenna assembly 104 could include additional elements, such as electronics for processing signals from 136, 138, 140, and 142, or devices for adjusting orientation of antenna assembly 104, without departing from the scope hereof. Additionally, two or more antenna elements 136, 138, 140, and 142 could share one or more respective components without departing from the scope hereof.

Each antenna element 136, 138, 140, and 142 generates a respective electrical signal 144, 146, 148, and 150 in response to wireless signals 124. Phase shifting devices 108, 110, 112, and 114 shift phase of respective electrical signals 144, 146, 148, and 150 so that the electrical signals are at least substantially aligned in time. For example, in some embodiments, phase shifters 108 and 112 apply a positive 45-degree phase shift, and phase shifters 110 and 114 apply a negative 45-degree phase shift, so that electrical signals 144, 146, 148, and 150 are aligned in time. Some of phase shifters 108, 110, 112, and 114 could be omitted without departing from the scope hereof. For example, phase shifters 108 and 112 could each be configured to apply a 90-degree phase shift such that phase shifters 110 and 114 could be omitted. Similarly, phase shifters 110 and 114 could each be configured to apply a 90-degree phase shift such that phase shifters 108 and 112 could be omitted.

Phase shifting devices 108, 110, 112, and 114 could be either analog or digital devices, depending on the form of electrical signals 144, 146, 148, and 150. For example, in embodiments where antenna assembly 104 is configured to output electrical signals 144, 146, 148, and 150 in analog form, e.g. directly from the antenna elements, phase shifting devices 108, 110, 112, and 114 are analog devices. As another example, in embodiments where antenna assembly 104 includes analog-to-digital converters so that electrical signals 144, 146, 148, and 150 are in digital form, phase shifting devices 108, 110, 112, and 114 are digital devices.

Combining device 118 combines electrical signals 144, 146, 148, and 150 after any phase-shifting of these signals to generate a combined electrical signal 152. Combined electrical signal 152 is an electrical representation of wireless signals received by antenna assembly 104 in at least two different polarizations. The fact that antenna assembly 104 is at least a dual-polarized antenna assembly advantageously helps maximize amplitude of combined electrical signal 152 by enabling antenna assembly 106 to capture wireless signals 124 having different respective polarizations. Combining device 118 could be either an analog device or a digital device, depending on the form of electrical signals 144, 146, 148, and 150. Combining device 118 and/or phase shifting devices 108, 110, 112, and 114 are optionally co-packaged with antenna assembly 104. In some alternate embodiments, combining device 118 is omitted, and electrical signals 144, 146, 148, and 150 remain separate electrical signals.

Although system 100 is discussed above with respect to transmission of wireless signals 124 from antenna assembly 102 to antenna assembly 104, some embodiments of system 100 are configured to support transmission of wireless signals in the opposite direction, or transmission of wireless signals in two directions, i.e., from antenna assembly 102 to antenna assembly 104, and from antenna assembly 104 to antenna assembly 102. In these embodiments, at least two of antenna elements 128, 130, 132, and 134 may have different respective polarizations, and system 100 may further include phase shifting devices (not shown) and a combining device (not shown) communicatively coupled to antenna assembly 102, to generate a combined electrical signal from antenna assembly 102 that is analogous to combined electrical signal 152.

Figure 2:
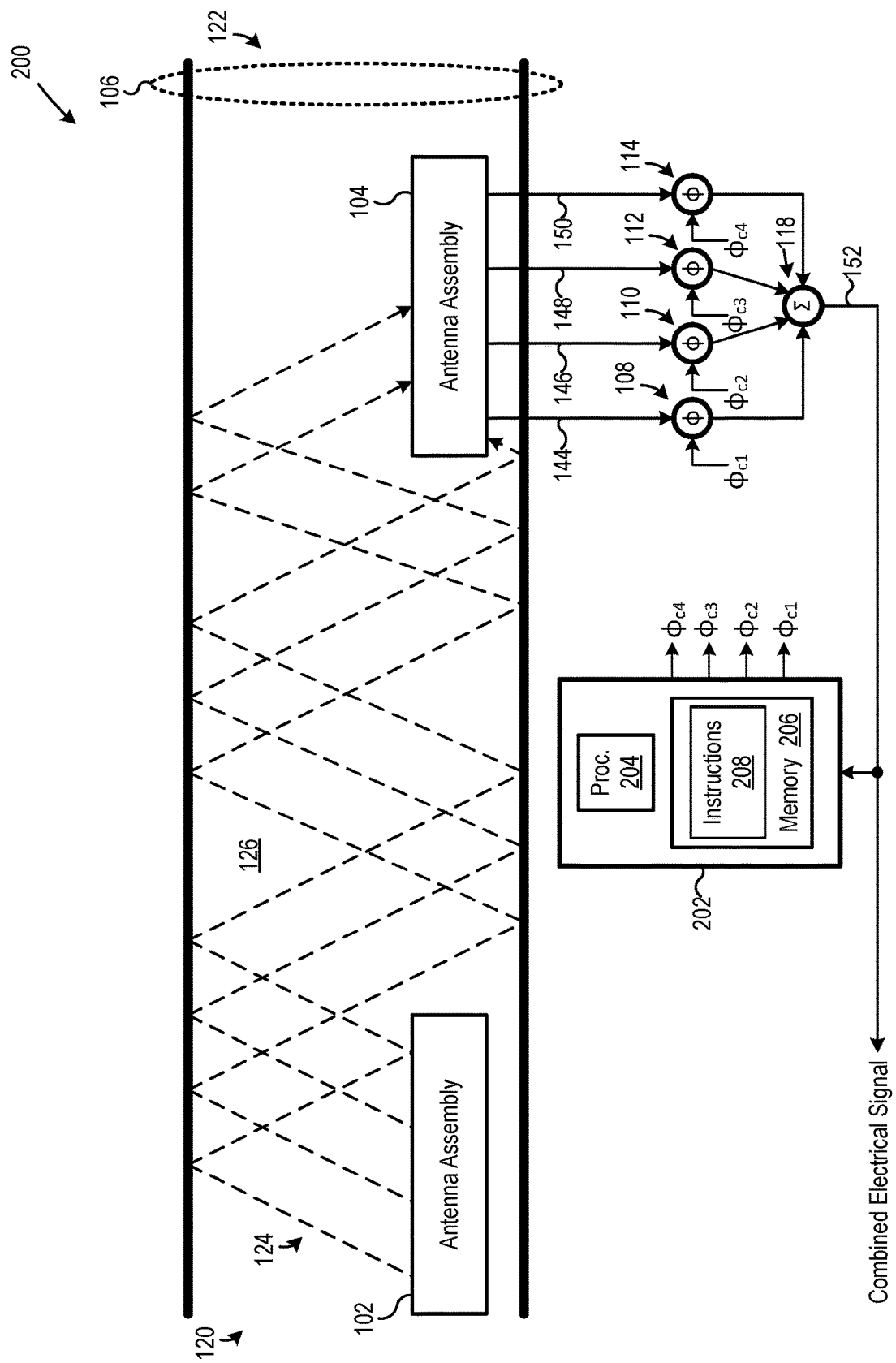
FIG. 2 is a schematic diagram illustrating a system for wireless communication in a reflective environment where the system is configured to dynamically adjust phase shift of electrical signals, according to an embodiment.
Figure 3:
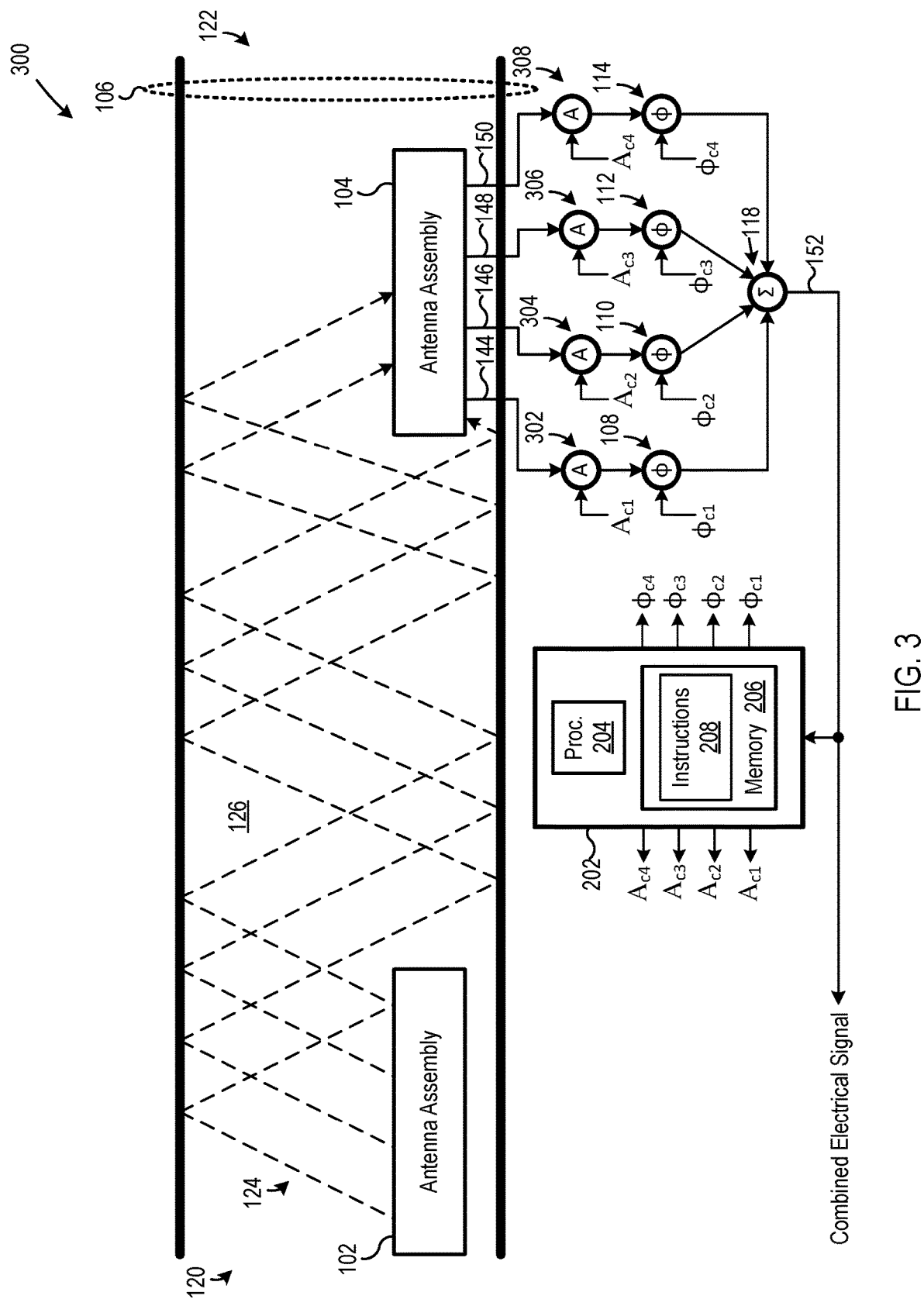
FIG. 3 is a schematic diagram illustrating a system for wireless communication in a reflective environment where the system is configured to adjust the amplitude of electrical signals and to adjust phase shift of the electrical signals, according to an embodiment.
Figure 4:
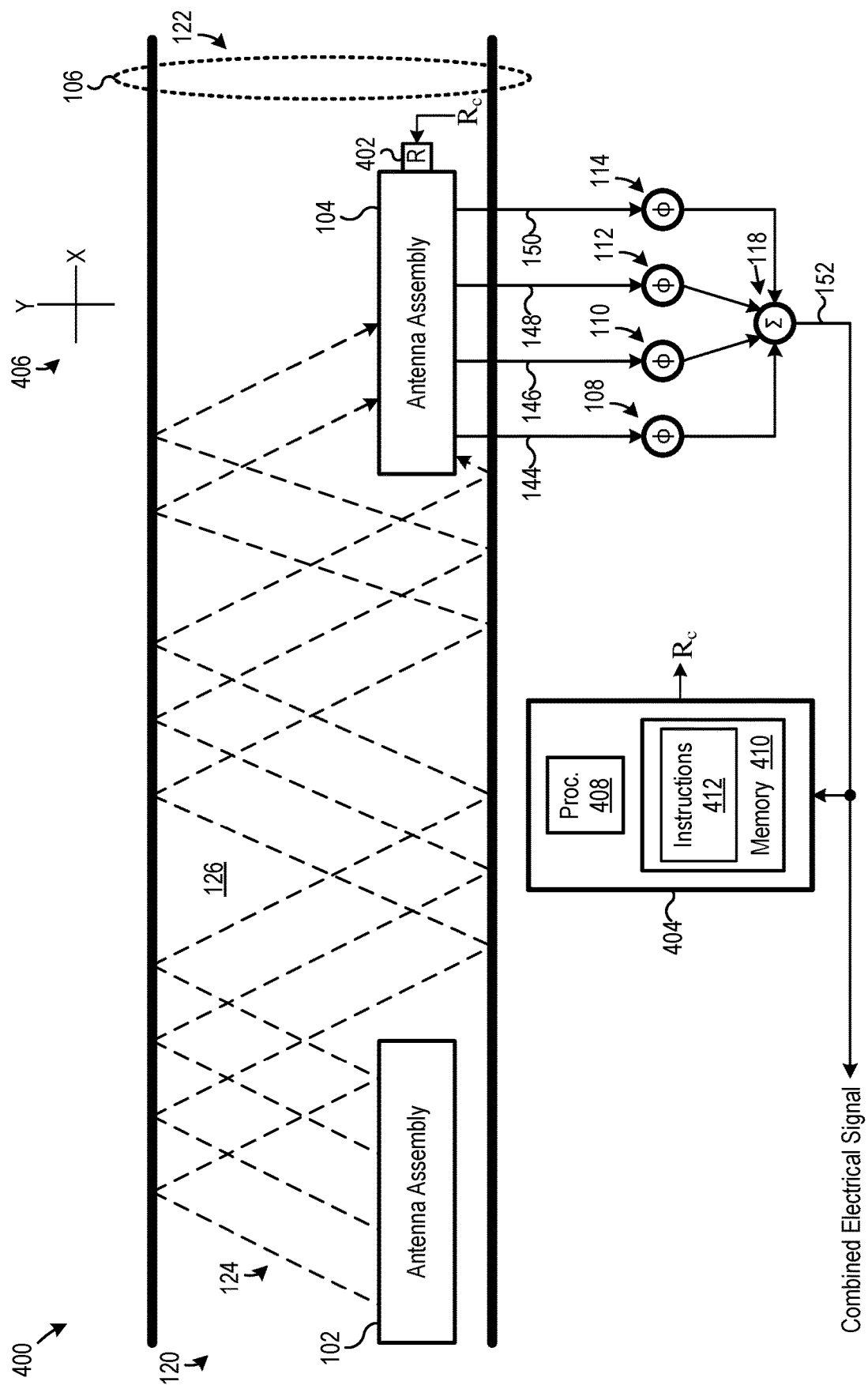
FIG. 4 is a schematic diagram illustrating a system for wireless communication in a reflective environment where the system is configured to rotate an antenna assembly, according to an embodiment.
Figure 5:
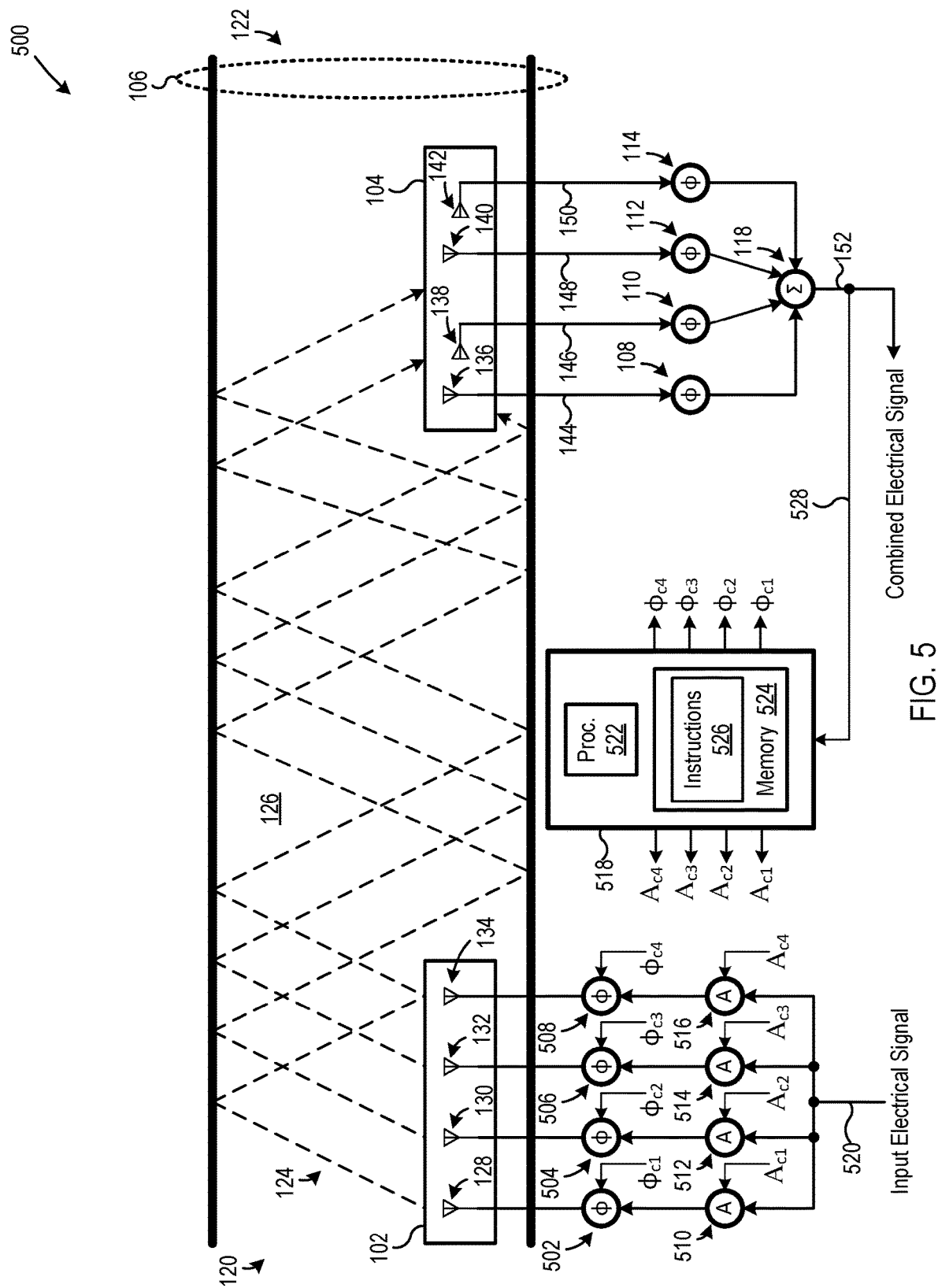
FIG. 5 is a schematic diagram illustrating a system for wireless communication in a reflective environment where the system is configured to dynamically adjust phase and magnitude of wireless signals, according to an embodiment.

In some embodiments, system 100 has a static configuration, e.g. phase shift of phase shifting devices 108, 110, 112, and 114 is fixed, configuration of antenna assembly 102 is fixed, and configuration of antenna assembly 104 is fixed. Such static configuration promotes simplicity and low cost of communication 100. However, communication system 100 could alternately be configured so that phase shift of at least one phase shifting device 108, 110, 112, and 114, configuration of antenna assembly 102, and/or configuration of antenna assembly 104 are dynamically adjusted to increase magnitude of combined electrical signal 152. Discussed below with respect to FIGS. 1-5 are several examples of embodiments of communication system 100 configured to dynamically adjust one or elements to increase magnitude of combined electrical signal 152. However, it should be appreciated that dynamically adjustable embodiments of communication system 100 are not limited to these particular configurations. Additionally, two or more features of the different configurations of FIGS. 1-5 could be combined without departing from the scope hereof. For example, control of phase shifting devices as illustrated in FIG. 2, or control of both phase shifting devices and attenuation devices as illustrated in FIG. 3, could be combined with control of antenna assembly 102 as illustrated in FIG. 5.

FIG. 2 is a schematic diagram illustrating a system 200 for wireless communication in a reflective environment, where the system is configured to dynamically adjust phase shift of electrical signals 144, 146, 148, and 150. System 200 is similar to system 100 of FIG. 1, but system 200 further includes a controller 202 configured to control phase shifting devices 108, 110, 112, and 114. Details of antenna assemblies 102 and 104 are not shown in FIG. 2.

Controller 202 includes a processor 204 and a memory 206. Processor 204 is configured to execute instructions 208 stored in memory 206 to generate phase control signals $\phi_{c1}$, $\phi_{c2}$, $\phi_{c3}$, $\phi_{c4}$ for controlling phase shifting devices 108, 110, 112, and 114, respectively. Connections between controller 202 and phase shifting devices 108, 110, 112, and 114 are not shown to promote illustrative clarity. Processor 204 and memory 206 could be replaced by, or supplemented with, analog and/or digital electronic circuitry without departing from the scope hereof. In some embodiments, controller 202 generates phase control signals $\phi_{c1}$, $\phi_{c2}$, $\phi_{c3}$, $\phi_{c4}$ to maximize magnitude of combined electrical signal 152. For example, in one embodiment, controller 202 performs a perturb and observed algorithm with respect to phase control signal $\phi_{c1}$ to find a particular value of phase control signal $\phi_{c1}$ which at least substantially maximizes magnitude of combined electrical signal 152. Controller 202 performs the perturb and observe algorithm, for instance, by stepping phase control signal $\phi_{c1}$ in a first direction and observing whether the step increased or decreased magnitude of combined electrical signal 152. If the step increased magnitude of combined electrical signal 152, controller 202 again steps phase control signal $\phi_{c1}$ in the first direction, and if the step decreased magnitude of combined electrical signal 152, controller 202 steps phase control signal $\phi_{c1}$ in an opposite second direction. Controller 202 continues this process until phase control signal $\phi_{c1}$ is set to a value which at least substantially maximizes combined electrical signal 152.

In some embodiments, controller 202 sets remaining phase control signals $\phi_{c2}$, $\phi_{c3}$, $\phi_{c4}$ according to a predetermined relationship between the antenna elements associated with the phase control signals. For example, if controller 202 determines that magnitude of combined electrical signal 152 has a maximum value when phase control signal $\phi_{c1}$ is set to value y, controller may set both phase control signals $\phi_{c1}$ and $\phi_{c3}$ to value y since associated antenna elements 136 and 140 have a common polarization. Controller 202 may also set phase control signals $\phi_{c2}$ and $\phi_{c4}$ to a value which achieves a 90-degree phase shift from value y to compensate for antenna elements 138 and 142 associated with phase control signals $\phi_{c2}$ and $\phi_{c4}$ having different polarizations than antenna elements 136 and 140. In some other embodiments, controller 202 is configured to independently set each phase control signal $\phi_{c1}$, $\phi_{c2}$, $\phi_{c3}$, $\phi_{c4}$ to maximize magnitude of combined electrical signal 152 and/or to achieve another desired outcome.

FIG. 3 is a schematic diagram illustrating a system 300 for wireless communication in a reflective environment, where the system is configured to adjust amplitude of electrical signals 144, 146, 148, and 150, as well as to adjust phase shift of electrical signals 144, 146, 148, and 150. System 300 is similar to system 200 of FIG. 2, but system 300 further includes attenuation devices 302, 304, 306, and 308 configured to attenuate electrical signals 144, 146, 148, and 150, respectively. In some embodiments, however, attenuation devices 302, 304, 306, and 308 are capable of increasing, as well as decreasing, magnitude of electrical signals 144, 146, 148, and 150, respectively. Attenuation devices 302, 304, 306, and 308 are controlled by attenuation control signals $A_{c1}$, $A_{c2}$, $A_{c3}$, and $A_{c4}$, respectively, and controller 200 is configured in system 300 such that processor 204 executes instructions 208 to generate attenuation control signals $A_{c1}$, $A_{c2}$, $A_{c3}$, and $A_{c4}$. Controller 200 is configured, for example, to generate attenuation control signals $A_{c1}$, $A_{c2}$, $A_{c3}$, and $A_{c4}$ to prevent excess power dissipation in combining device 118. For instance, in some embodiments, controller 200 is configured to generate attenuation control signals $A_{c1}$, $A_{c2}$, $A_{c3}$, and $A_{c4}$ such that each electrical signal 144, 146, 148, and 150 has at least substantially the same magnitude, to promote efficient combination of the electrical signals in combining device 118. Additionally, in some embodiments, controller 200 is configured to generate attenuation control signals $A_{c1}$, $A_{c2}$, $A_{c3}$, and $A_{c4}$ such that any electrical signal 144, 146, 148, and 150 which does not have sufficient magnitude is blocked from being transmitted to combining device 118, to prevent coupling of noise into combined electrical signal 152. In certain alternate embodiments, phase shifting devices 108, 110, 112, and 114 are static, and controller 200 is configured to control only attenuation devices 302, 304, 306, and 308. In some alternate embodiments, combining device 118 is omitted, and electrical signals 144, 146, 148, and 150 remain separate electrical signals.

Polarization of antenna assembly 104 can be adjusted, for example, by adjusting a physical orientation of the antenna assembly relative to reflective conduit 106, to potentially increase magnitude of combined electrical signal 152. For example, FIG. 4 is a schematic diagram illustrating a system 400 for wireless communication in a reflective environment, where the system is configured to rotate antenna assembly 104 to increase magnitude of combined electrical signal 152.

System 400 is similar to system 100 of FIG. 1, but system 400 further includes a rotation device 402 and a controller 404. Rotation device 402 is configured to rotate antenna assembly 104 about at least one of an x-axis, a y-axis, and a z-axis. A coordinate axis 406 in FIG. 4 shows the x-axis and the y-axis, and the z-axis is into the page of FIG. 4. Rotation device 402 includes, for example, one or more electric motors and/or more electric solenoid devices. Controller 404 generates a rotation control signal $R_c$ to control rotation device 402. Controller 404 includes a processor 408 and a memory 410. Processor 408 is configured to execute instructions 412 stored in memory 410 to generate rotation control signal $R_c$. Connections between controller 404 and rotation device 402 are not shown to promote illustrative clarity. Processor 408 and memory 410 could be replaced by, or supplemented with, analog and/or digital electronic circuitry without departing from the scope hereof.

In some embodiments, controller 404 generates rotation control signal $R_c$ to maximize magnitude of combined electrical signal 152. For example, in one embodiment, controller 404 performs a perturb and observed algorithm with respect to rotation control signal $R_c$ to find a particular value of the signal which at least substantially maximizes magnitude of combined electrical signal 152. Controller 404 performs the perturb and observe algorithm, for instance, by stepping rotation control signal $R_c$ in a first direction and observing whether the step increased or decreased magnitude of combined electrical signal 152. If the step increased magnitude of combined electrical signal 152, controller 202 again steps rotation control signal $R_c$ in the first direction, and if the step decreased magnitude of combined electrical signal 152, controller 202 steps rotation control signal $R_c$ in an opposite second direction. Controller 404 continues this process until rotation control signal $R_c$ is set to a value which at least substantially maximizes combined electrical signal 152. In some embodiments, rotation control signal $R_c$ need be adjusted only very infrequently, such as in cases where system 400 is stationary after being configured.

FIG. 5 is a schematic diagram illustrating a system 500 for wireless communication in a reflective environment, where the system is configured to dynamically adjust phase and magnitude of wireless signals 124. System 500 is similar to system 100 of FIG. 1, but system 500 further includes phase shifting devices 502, 504, 506, and 508, attenuation devices 510, 512, 514, and 516, and a controller 518. Phase shifting devices 502, 504, 506, and 508 are configured to shift phase of an input electrical signal 520 delivered to antenna elements 502, 504, 506, and 508, respectively. Phase shifting devices 502, 504, 506, and 508 are controlled by phase control signals $\phi_{c1}$, $\phi_{c2}$, $\phi_{c3}$, $\phi_{c4}$ generated by controller 518. Attenuation devices 510, 512, 514, and 516 are configured to attenuate input electrical signal 520 delivered to antenna elements 502, 504, 506, and 508, respectively. In some embodiments, however, attenuation devices 510, 512, 514, and 516 are capable of increasing, as well as decreasing, magnitude of input electrical signal 520 delivered to antenna elements 502, 504, 506, and 508, respectively. Attenuation devices 510, 512, 514, and 516 are controlled by attenuation control signals $A_{c1}$, $A_{c2}$, $A_{c3}$, and $A_{c4}$ generated by controller 518. Connections between controller 518 and phase shifting devices 502, 504, 506, and 508, and connections between controller 518 and attenuation devices 510, 512, 514, and 516, are not shown to promote illustrative clarity.

Controller 518 includes a processor 522 and a memory 524. Processor 522 is configured to execute instructions 526 stored in memory 524 to control antenna assembly 102 by generating phase control signals $\phi_{c1}$, $\phi_{c2}$, $\phi_{c3}$, $\phi_{c4}$ and attenuation control signals $A_{c1}$, $A_{c2}$, $A_{c3}$, and $A_{c4}$. Processor 522 and memory 524 could be replaced by, or supplemented with, analog and/or digital electronic circuitry without departing from the scope hereof. In some embodiments, controller 518 generates phase control signals $\phi_{c1}$, $\phi_{c2}$, $\phi_{c3}$, $\phi_{c4}$ and attenuation control signals $A_{c1}$, $A_{c2}$, $A_{c3}$, and $A_{c4}$ to adjust phase and magnitude of wireless signals 124 to maximize, or at least increase, magnitude of combined electrical signal 152. In these embodiments, a feedback signal 528 representing magnitude of combined electrical signal 152 is provided to controller 518 to enable controller 518 to monitor magnitude of combined electrical signal 528. In some embodiments, controller executes instructions 526 to perform perturb and observe algorithms to maximize magnitude of combined electrical signal 152 by controlling phase and magnitude of wireless signals 124. In some alternate embodiments, attenuation devices 510, 512, 514, and 516 are omitted and controller 518 controls antenna assembly 102 to increase magnitude of combined electrical signal 152 by controlling only phase of wireless signals 124. In some other alternate embodiments, phase shifting devices 502, 504, 506, and 508 are omitted and controller 518 controls antenna assembly 102 to increase magnitude of combined electrical signal 152 by controlling only magnitude of wireless signals 124.

Figure 6:
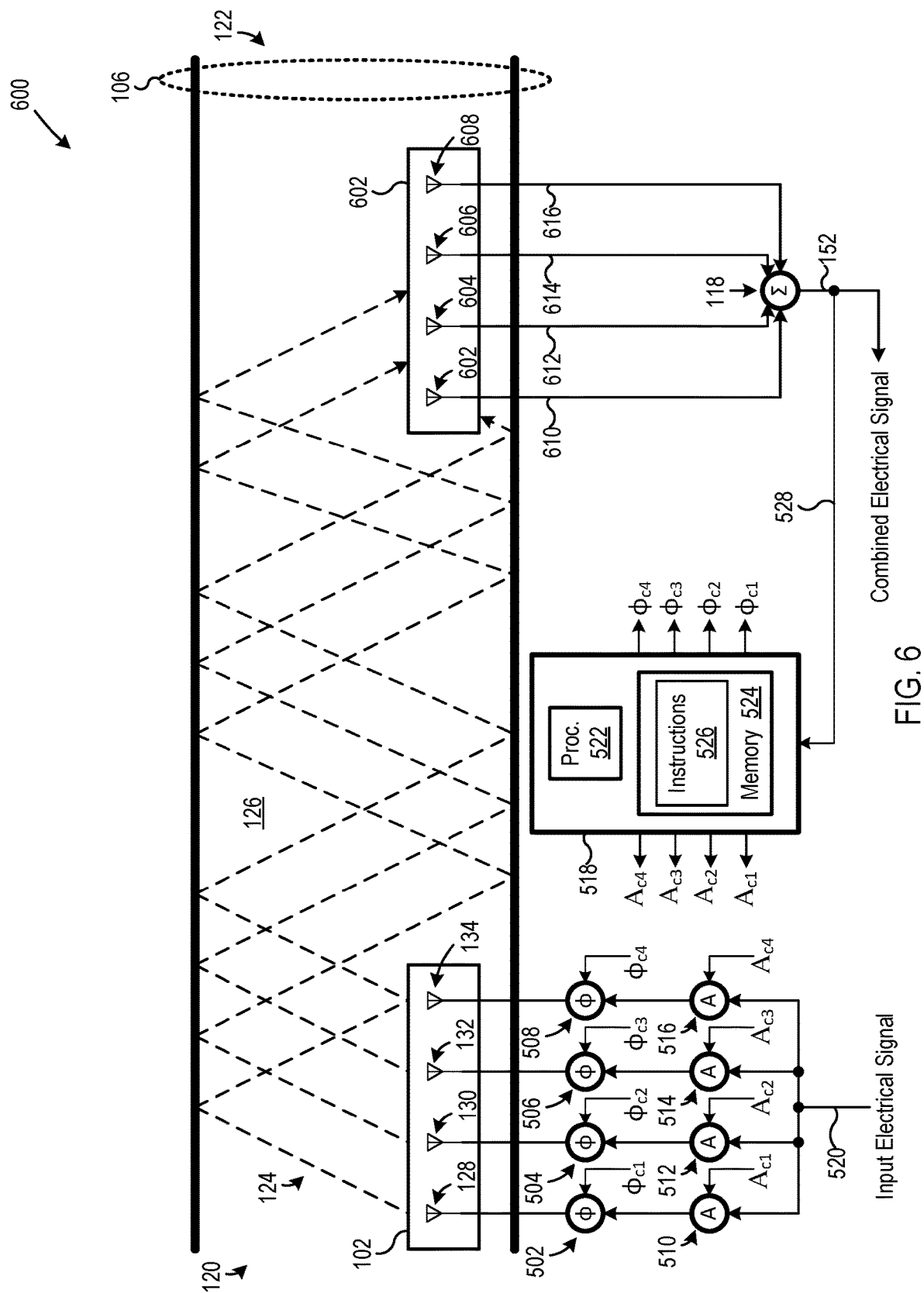
FIG. 6 is a schematic diagram illustrating another system for wireless communication in a reflective environment where the system is configured to dynamically adjust phase and magnitude of wireless signals, according to an embodiment.

FIG. 6 is a schematic diagram illustrating a system 600 for wireless communication in a reflective environment, where the system is configured to dynamically adjust phase and magnitude of wireless signals 124. System 600 is similar to system 500 of FIG. 5, but system 600 includes antenna assembly 602 in place of antenna assembly 104. Antenna assembly 602 is a single-polarized antenna assembly including antenna elements 602, 604, 608, and 608 with like polarization. Antenna elements 602, 604, 608, and 608 generate electrical signals 610, 612, 614, and 616, respectively, and these electrical signals are combined by combining device 118 to generate combined electrical signals 152. The number of antenna elements of antenna assembly 602 could be modified without departing from the scope hereof. Phase shifting devices 108, 110, 112, and 114 are omitted in system 600 because the antenna elements of antenna assembly 602 have like orientation. System 600 otherwise operates in a manner similar to that of system 500.

Figure 7:
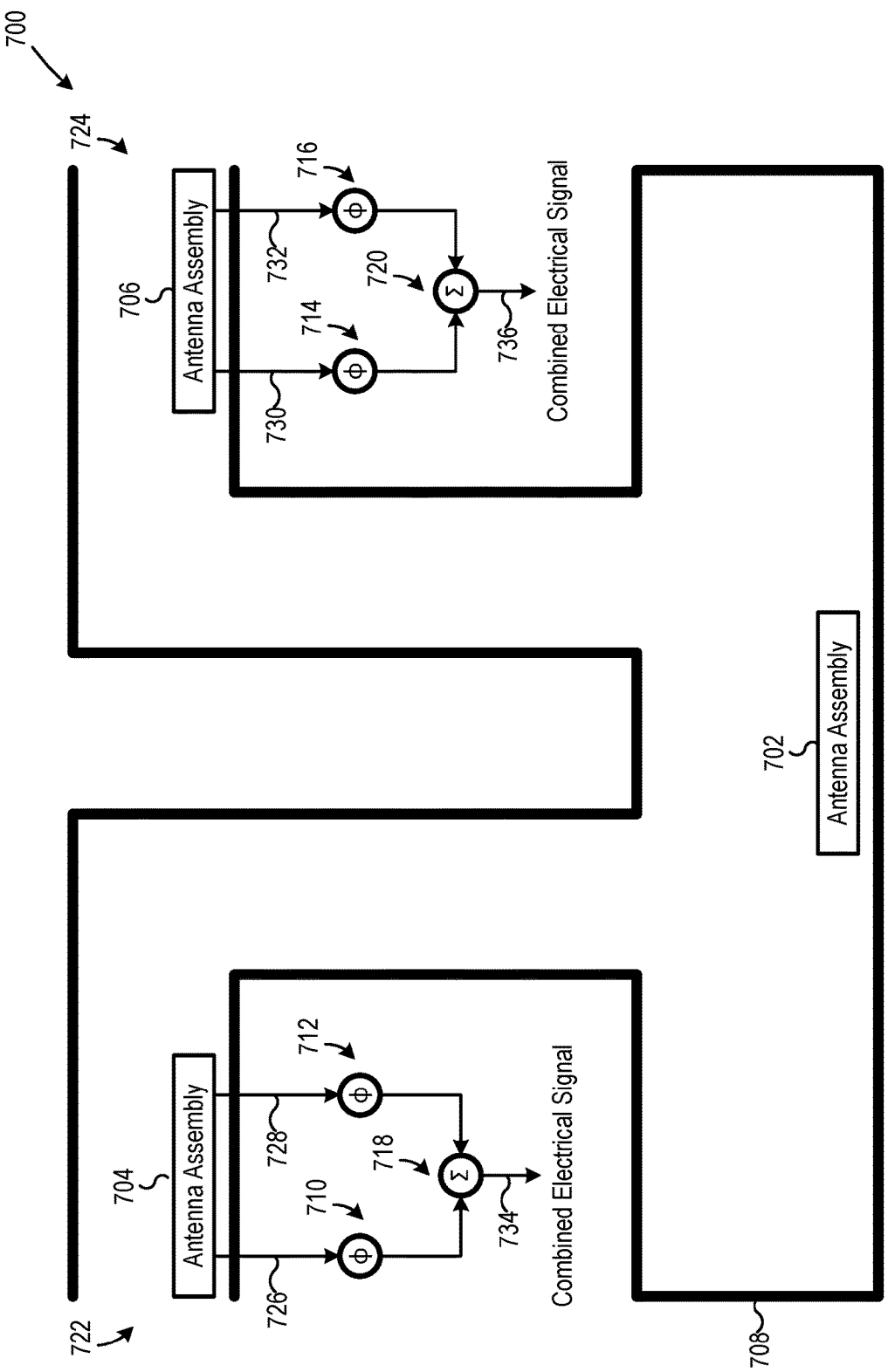
FIG. 7 is a schematic diagram illustrating a system for wireless communication in a reflective environment including two paths, according to an embodiment.

As discussed above, the methods and systems disclosed herein are not limited to a single path in a reflective environment. For example, FIG. 7 is a schematic diagram illustrating a system 700 for wireless communication in a reflective environment including two paths, where each path can be considered a separate reflective environment. System 700 includes an antenna assembly 702, an antenna assembly 704, an antenna assembly 706, reflective conduit 708, a phase shifting device 710, a phase shifting device 712, a phase shifting device 714, a phase shifting device 716, a combining device 718, and a combining device 720. In certain embodiments, antenna assemblies 702, 704, and 706 are part of a Wi-Fi wireless communication system (e.g., a scheduled, a partially scheduled, or an unscheduled system), a LTE wireless communication system, a 5G NR wireless communication system (e.g. licensed or unlicensed), a 6G wireless communication system, or variations and/or extensions thereof.

In some embodiments, reflective conduit 708 is a metal duct system. In some other embodiments, reflective conduit 708 is a tunnel system or a structure at least partially formed by one or more buildings and/or other man-made or natural objects. Although reflective conduit 708 is illustrated in cross-sectional view in FIG. 7 to show features within the conduit, it is anticipated that reflective conduit 106 will be completely or partially enclosed except at ends 722 and 724.

Antenna assemblies 702, 704, and 706 are disposed such that reflective conduit 708 provides two paths for wireless signals, i.e. a first path between antenna assembly 702 and antenna assembly 704, and a second path between antenna assembly 702 and antenna assembly 706. Wireless signals are not shown in FIG. 7 to promote illustrative clarity. Antenna assembly 702 includes one or more antenna elements (not shown) which are configured to generate wireless signals in response to one or more electrical signals encoded with information to be transmitted to antenna assemblies 704 and 706. In some embodiments, antenna assembly 702 is configured to direct different respective wireless signals to each of antenna assembly 704 and antenna assembly 706. Each antenna assembly 704 and 706 is a dual-polarized antenna assembly including antenna elements with horizontal polarization and antenna elements with vertical polarization. The multi-polarization of antenna assemblies 704 and 706 advantageously enables system 700 to capture wireless signals having multiple polarizations, in a manner analogous to that discussed above with respect to FIG. 1.

Antenna assembly 704 includes a horizontally-polarized antenna element (not shown) and a vertically-polarized antenna element (not shown) configured to generate electrical signals 726 and 728, respectively, in response to wireless signals generated by antenna assembly 702. Antenna assembly 706 includes a horizontally-polarized antenna element (not shown) and a vertically-polarized antenna element (not shown) configured to generate electrical signals 730 and 732, respectively, in response to wireless signals generated by antenna assembly 702. However, each of antenna assemblies 704 and 706 could be modified to include additional antenna elements without departing from the scope hereof. Additionally, each antenna assembly 702, 704, and 706 could include additional elements, e.g. electronics, without departing from the scope hereof.

Phase shifting devices 710 and 712 shift phase of respective electrical signals 726 and 728 so that the electrical signals are at least substantially aligned in time, and one of phase shifting devices 710 and 712 could be omitted without departing from the scope hereof. Similarly, phase shifting devices 714 and 716 shift phase of respective electrical signals 730 and 732 so that the electrical signals are at least substantially aligned in time, and one of phase shifting devices 714 and 716 could be omitted without departing from the scope hereof. Combining device 718 combines electrical signals 726 and 728 after any phase-shifting of these electrical signals to generate a combined electrical signal 734, and combining device 720 combines electrical signals 730 and 732 after any phase-shifting of these electrical signals to generate a combined electrical signal 736. Combining device 718 and/or phase shifting devices 710 and 712 are optionally co-packaged with antenna assembly 704, and combining device 720 and/or phase shifting devices 714 and 716 are optionally co-packaged with antenna assembly 706.

Although system 700 is discussed above with respect transmission of wireless signals from antenna assembly 702 to antenna assemblies 704 and 706, some embodiments of system 700 are configured to support transmission of wireless signals in the opposite directions or in two directions, i.e., from antenna assembly 702 to antenna assemblies 704 and 706, and from antenna assemblies 704 and 706 to antenna assembly 702. Additionally, communication system 700 could be adapted to dynamically adjust one or elements to increase magnitude of combined electrical signals 734 and/or 736, such as using one or more of the techniques discussed above with respect to FIGS. 2-5.

Figure 8:
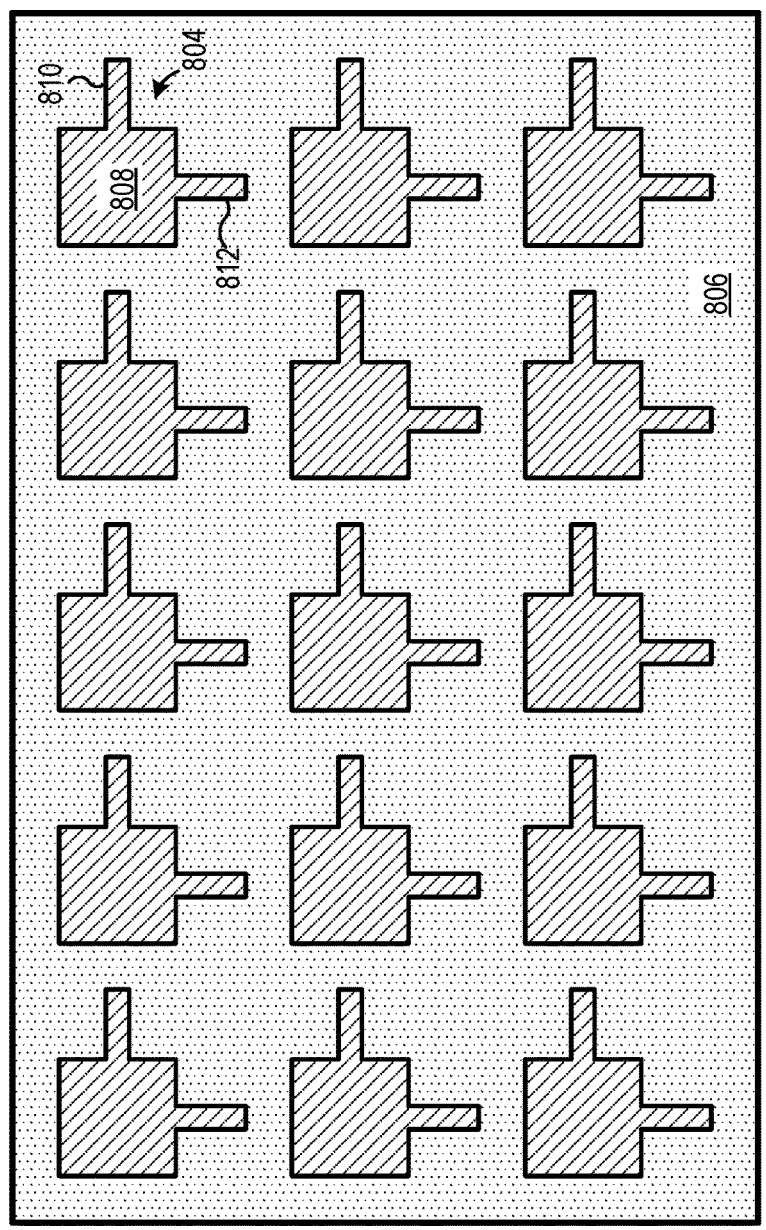
FIG. 8 is a top plan view of a patch antenna assembly, according to an embodiment.
Figure 9:
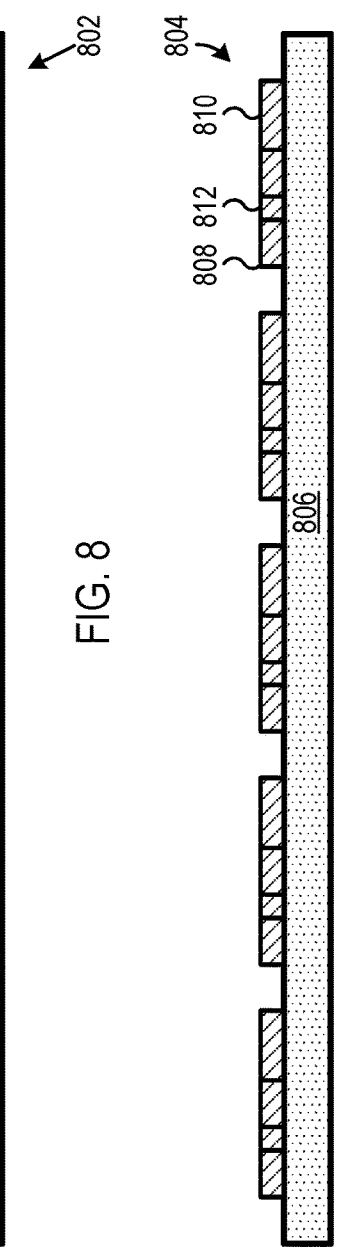
FIG. 9 is a side elevational view of the FIG. 8 patch antenna assembly.

FIG. 8 is a top plan view of a patch antenna assembly 800, and FIG. 9 is a side elevational view of a side 802 of patch antenna assembly 800. Patch antenna assembly 800 is one possible embodiment of the dual-polarized antennas discussed above. For example, antenna assembly 104 of FIG. 1 could be implemented by patch antenna assembly 800. Patch antenna assembly 800 includes an array of dual antenna elements 804 disposed on a non-conductive substrate 806 (e.g., a printed circuit board substrate). Only one instance of dual antenna elements 804 is labeled in FIGS. 8 and 9 to promote illustrative clarity. Each dual antenna element 804 includes a central portion 808, a horizontal port 810, and a vertical port 812. Central portion 808, horizontal port 810, and vertical port 812 are formed, for example, of metallic conductive foil on non-conductive substrate 806. In each dual antenna element 804, central portion 808 and horizontal port 810 collectively form a horizontally-polarized antenna element, and central portion 808 and vertical port 812 collectively form a vertically-polarized antenna element. Thus, in each dual antenna element 804, the horizontally-polarized antenna element and the vertically-polarized antenna element share a common central portion. The number of dual antenna elements 804 of antenna assembly 800 may be varied without departing from the scope hereof. Additionally, non-conductive substrate 806 could have a different shape, e.g. circular instead of rectangular, without departing from the scope hereof.

Figure 10:
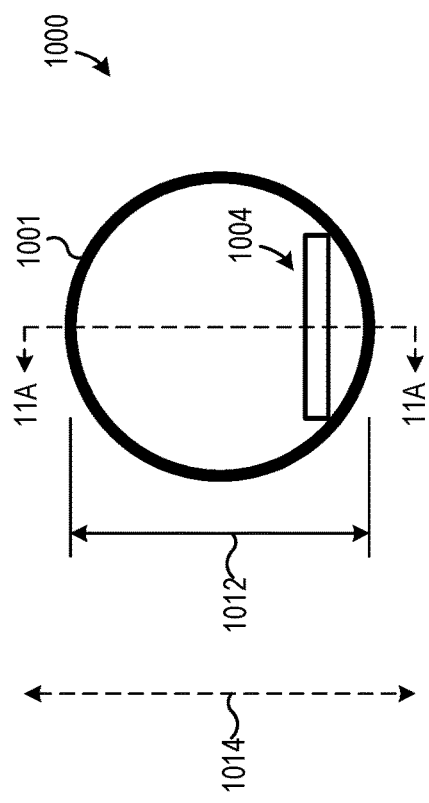
FIG. 10 is an end elevational view of a metal duct assembly, according to an embodiment.
Figure 11:
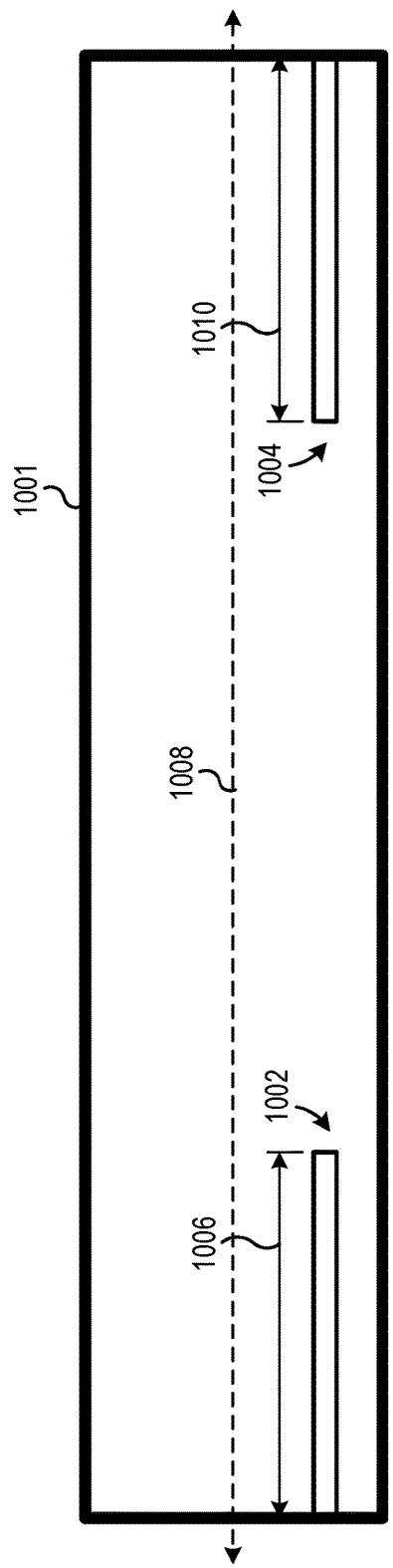
FIG. 11 is a cross-sectional view of the FIG. 10 metal duct assembly.

FIG. 10 is an end elevational view of a metal duct assembly 1000, and FIG. 11 is a cross-sectional view of metal duct assembly 1000 taken along line 11A-11A of FIG. 10. Metal duct assembly 1000 is one example of a physical implementation of system 100 of FIG. 1. Metal duct assembly 1000 includes metal duct 1001 and antenna assemblies 1002 and 1004 located within metal duct 1001. Details of antenna assemblies 1002 and 1004 are not shown, although in some embodiments, each of antenna assemblies 1002 and 1004 is a patch antenna assembly similar to an embodiment of patch antenna assembly 800 of FIGS. 8 and 9. Antenna assembly 1002 has a length 1006 along an elongated axis 1008 of metal duct 1001, and antenna assembly 1004 has a length 1010 along elongated axis 1008. Each of length 1006 and length 1010 is greater than a cross-sectional height 1012 of metal duct 1001 along an axis 1014, where axis 1014 is orthogonal to axis 1008. The fact that lengths 1006 and 1010 are greater than cross-sectional height 1012 helps maximize capture of wireless signals in metal duct 1001 by the antenna assemblies.

Figure 12:
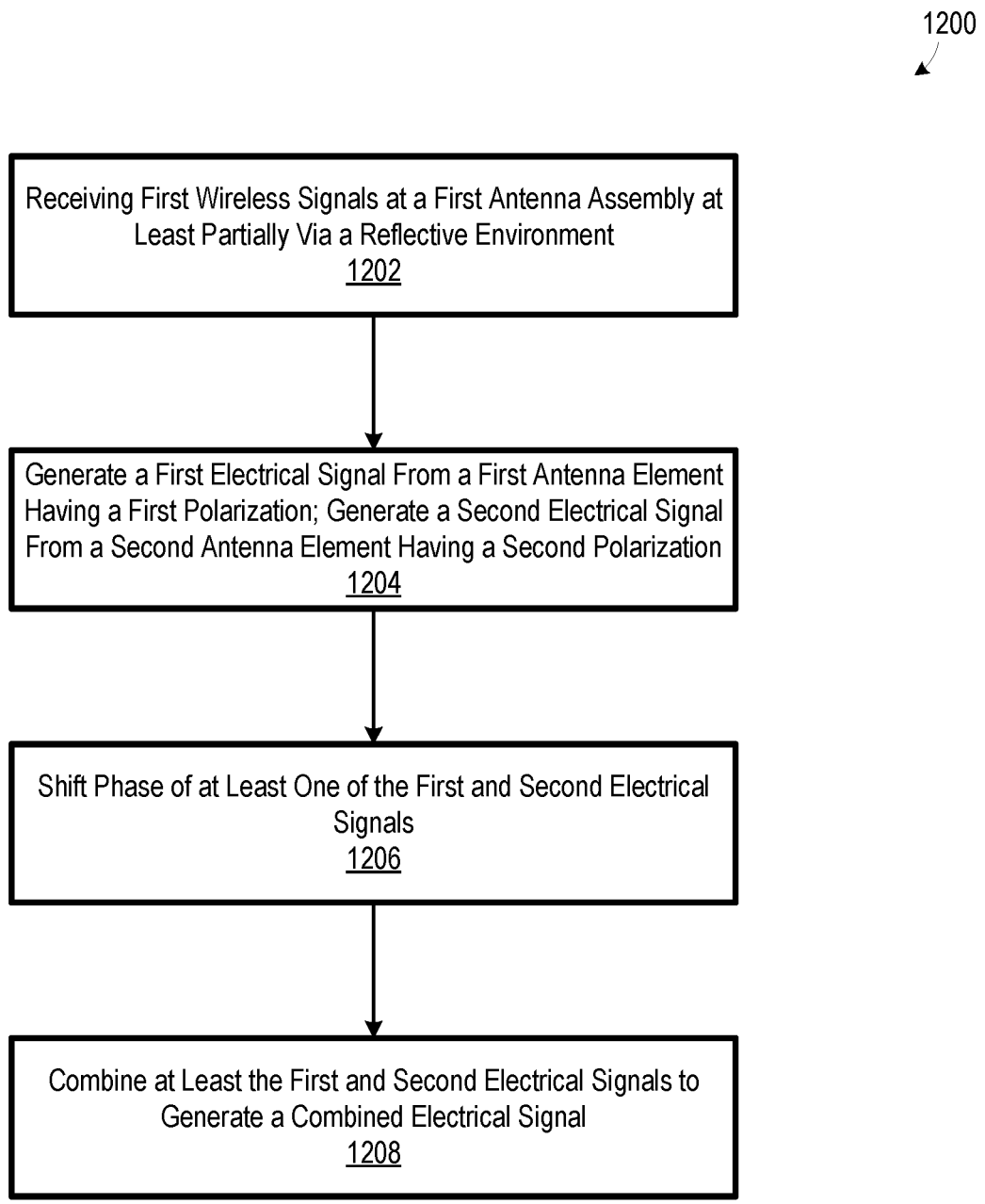
FIG. 12 is a flow chart illustrating a method for wireless communication in a reflective environment, according to an embodiment.

FIG. 12 is a flow chart illustrating a method for wireless communication in a reflective environment. In a block 1202, first wireless signals are received at a first antenna assembly at least partially via a first reflective environment. In one example of block 1202, wireless signals 124 are received at antenna assembly 104 at least partially via reflective conduit 106 (FIG. 1). In a block 1204, a first electrical signal is generated from a first antenna element of the first antenna assembly in response to the first wireless signals, and a second electrical signal is generated from a second antenna element of the first antenna assembly in response to the first wireless signals. The first antenna element has a first polarization, and the second antenna element has a second polarization different from the first polarization. In one example of step 1204, antenna element 136 generates electrical signal 144, and antenna element 138 generates electrical signal 146. In a block 1206, phase is shifted of at least one of the first electrical signal and the second electrical signal. In one example of block 1206, phase shifting device 108 shifts phase of electrical signal 144, and phase shifting device 110 shifts phase of electrical signal 146. In a block 1208, at least the first electrical signal and the second electrical signal are combined to generate a combined electrical signal, after shifting phase in block 1206. In one example of block 1208, combining device 118 combines at least electrical signals 144 and 146 to generate combined electrical signal 152.

Figure 13:
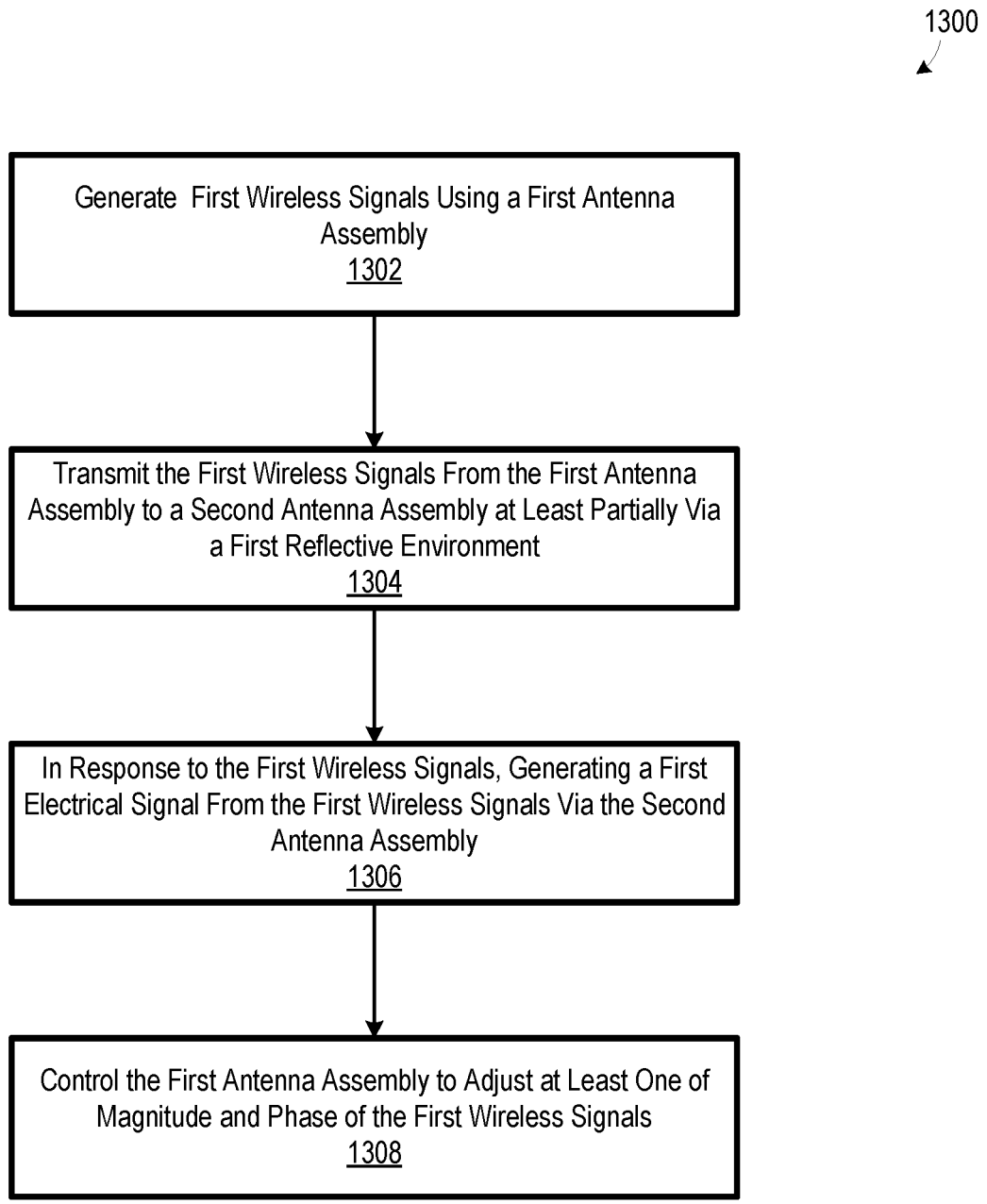
FIG. 13 is a flow chart illustrating another method for wireless communication in a reflective environment, according to an embodiment.

FIG. 13 is a flow chart illustrating another method for wireless communication in a reflective environment. In a block 1302, first wireless signals are generated using a first antenna assembly. In one example of block 1302, antenna assembly 102 generates wireless signals 124 (FIG. 5). In a block 1304, the first wireless signals are transmitted from the first antenna assembly to a second antenna assembly at least partially via a first reflective environment. In one example of block 1304, reflective conduit 106 transmits wireless signals 124 from antenna assembly 102 to antenna assembly 104. In a block 1306, a first electrical signal is generated from the first wireless signals via at least a second antenna assembly. In one example of block 1306, combined electrical signal 152 is generated from wireless signals 152 via antenna assembly 104, phase shifting devices 108, 110, 112, and 114, and combining device 118. In a block 1308, a first antenna assembly is controlled to adjust at least one of magnitude and phase of the first wireless signals, to increase a magnitude of the first electrical signal. In one example of block 1308, controller 518 controls antenna assembly 102 to increase magnitude of combined electrical signal 152.

Combinations of Features

Features described above may be combined in various ways without departing from the scope hereof. The following examples illustrate some possible combinations:

(A1) A method for wireless communication in a reflective environment may include (1) receiving first wireless signals at a first antenna assembly at least partially via a first reflective environment, (2) generating a first electrical signal from a first antenna element of the first antenna assembly in response to the first wireless signals, the first antenna element having a first polarization, (3) generating a second electrical signal from a second antenna element of the first antenna assembly in response to the first wireless signals, the second antenna element having a second polarization different from the first polarization, (4) shifting phase of at least one of the first electrical signal and the second electrical signal, and (5) after shifting phase, combining at least the first electrical signal and the second electrical signal to generate a combined electrical signal.

(A2) In the method denoted as (A1), receiving the first wireless signals may include receiving the first wireless signals through a reflective conduit.

(A3) In the method denoted as (A2), the reflective conduit may include a metal duct.

(A4) In the method denoted as (A3), the first antenna assembly may include a patch antenna assembly disposed in the metal duct along a first axis, and the patch antenna assembly may have a length along the first axis that is greater than a cross-sectional height of the metal duct along a second axis, the second axis being orthogonal to the first axis.

(A5) Any one of the methods denoted as (A1) through (A4) may further include adjusting a polarization of the first antenna assembly to increase a magnitude of the combined electrical signal.

(A6) The method denoted as (A5) may further include adjusting a physical orientation of the first antenna assembly to adjust the polarization of the first antenna assembly.

(A7) In the method denoted as (A6), adjusting the physical orientation of the first antenna assembly may include rotating the first antenna assembly.

(A8) Any one of the methods denoted as (A1) through (A7) may further include changing phase shift of at least one of the first electrical signal and the second electrical signal to increase a magnitude of the combined electrical signal.

(A9) Any one of the methods denoted as (A1) through (A8) may further include changing magnitude of at least one of the first electrical signal and the second electrical signal before combining the first electrical signal and the second electrical signal.

(A10) Any one of the methods denoted as (A1) through (A9) may further include (1) generating a third electrical signal from a third antenna element of the first antenna assembly, the third antenna element having a third polarization, (2) generating a fourth electrical signal from a fourth antenna element of the first antenna assembly, the fourth antenna element having a fourth polarization different from the third polarization, (3) shifting phase of at least one of the third electrical signal and the fourth electrical signal, and (4) after shifting phase of at least one of the third electrical signal and the fourth electrical signal, combining at least the first electrical signal, the second electrical signal, the third electrical signal, and the fourth electrical signal, to generate the combined electrical signal.

(A11) In the method denoted as (A10), the first polarization may be the same as the third polarization, and the second polarization may be the same as the fourth polarization.

(A12) In any one of the methods denoted as (A1) through (A11), the first antenna element and the second antenna element may share at least one common component.

(A13) Any one of the methods denoted as (A1) through (A12) may further include generating the first wireless signal via a second antenna assembly.

(A14) The method denoted as (A13) may further including controlling the second antenna assembly to adjust at least one of a phase and a magnitude of the first wireless signal to increase a magnitude of the combined electrical signal.

(A15) Any one of the methods denoted as (A1) through (A14) may further include (1) receiving second wireless signals at a second antenna assembly at least partially via a second reflective environment, (2) in response to the second wireless signals, generating a third electrical signal from a third antenna element of the second antenna assembly, the third antenna element having a third polarization, (3) in response to the second wireless signals, generating a fourth electrical signal from a fourth antenna element of the second antenna assembly, the fourth antenna element having a fourth polarization different from the third polarization, (4) shifting phase of at least one of the third electrical signal and the fourth electrical signal, and (5) after shifting phase of at least one of the third electrical signal and the fourth electrical signal, combining at least the third electrical signal and the fourth electrical signal to generate a second combined electrical signal.

(B1) A method for wireless communication in a reflective environment may include (1) generating first wireless signals using a first antenna assembly, (2) transmitting the first wireless signals from the first antenna assembly to a second antenna assembly at least partially via a first reflective environment, (3) in response to the first wireless signals, generating a first electrical signal from the first wireless signals via at least a second antenna assembly, and (4) controlling the first antenna assembly to adjust at least one of magnitude and phase of the first wireless signals, to increase a magnitude of the first electrical signal.

(B2) In the method denoted as (B1), transmitting the first wireless signals may include transmitting the first wireless signals through a reflective conduit.

(B3) In the method denoted as (B2), the reflective conduit may include a metal duct.

(B4) In any one of the methods denoted as (B1) through (B3), the first antenna assembly may include a patch antenna assembly disposed in the metal duct along a first axis, and the patch antenna assembly may have a length along the first axis that is greater than a cross-sectional height of the metal duct along a second axis, the second axis being orthogonal to the first axis.

(B5) Any one of the methods denoted as (B1) through (B4) may further include (1) providing a feedback signal to a controller configured to control the first antenna assembly, the feedback signal representing magnitude of the first electrical signal, and (2) controlling the first antenna assembly according to the feedback signal, to adjust at least one of the magnitude and the phase of the first wireless signals.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for wireless communication in a reflective environment, comprising:
   receiving first wireless signals at a first antenna assembly at least partially via a first reflective environment including a metal duct;
   generating a first electrical signal from a first antenna element of the first antenna assembly in response to the first wireless signals, the first antenna element having a first polarization;
   after generating the first electrical signal from the first antenna element, shifting phase of the first electrical signal; and
   generating a second electrical signal from a second antenna element of the first antenna assembly, the second antenna element having a second polarization different from the first polarization.

2. The method of claim 1, wherein receiving the first wireless signals comprises receiving the first wireless signals through a reflective conduit.

3. The method of claim 1, further comprising adjusting a polarization of the first antenna assembly to increase a magnitude of at least one of the first and second electrical signals.

4. The method of claim 3, further comprising adjusting a physical orientation of the first antenna assembly to adjust the polarization of the first antenna assembly.

5. The method of claim 3, wherein adjusting the physical orientation of the first antenna assembly comprises rotating the first antenna assembly.

6. The method of claim 1, further comprising changing phase shift of the second electrical signal.

7. The method of claim 1, wherein the first antenna element and the second antenna element share at least one common component.

8. A method for wireless communication in a reflective environment, comprising:
   receiving first wireless signals at a first antenna assembly at least partially via a first reflective environment including a metal duct;
   generating a first electrical signal from a first antenna element of the first antenna assembly in response to the first wireless signals, the first antenna element having a first polarization;
   generating a second electrical signal from a second antenna element of the first antenna assembly, the second antenna element having a second polarization different from the first polarization;
   wherein the first antenna assembly comprises a patch antenna assembly disposed in the metal duct along a first axis; and
   wherein the patch antenna assembly has a length along the first axis that is greater than a cross-sectional height of the metal duct along a second axis, the second axis being orthogonal to the first axis.

9. A method for wireless communication in a reflective environment, comprising:
   receiving first wireless signals at a first antenna assembly at least partially via a first reflective environment including a metal duct;
   generating a first electrical signal from a first antenna element of the first antenna assembly in response to the first wireless signals, the first antenna element having a first polarization;
   generating a second electrical signal from a second antenna element of the first antenna assembly, the second antenna element having a second polarization different from the first polarization;
   changing magnitude of at least one of the first electrical signal and the second electrical signal; and combining the first electrical signal and the second electrical signal after changing magnitude of at least one of the first electrical signal and the second electrical signal.

10. A method for wireless communication in a reflective environment, comprising:
   receiving first wireless signals at a first antenna assembly at least partially via a first reflective environment including a metal duct;
   generating a first electrical signal from a first antenna element of the first antenna assembly in response to the first wireless signals, the first antenna element having a first polarization;
   generating a second electrical signal from a second antenna element of the first antenna assembly, the second antenna element having a second polarization different from the first polarization;
   generating a third electrical signal from a third antenna element of the first antenna assembly, the third antenna element having a third polarization;
   generating a fourth electrical signal from a fourth antenna element of the first antenna assembly, the fourth antenna element having a fourth polarization different from the third polarization;
   shifting phase of at least one of the third electrical signal and the fourth electrical signal; and
   after shifting phase of at least one of the third electrical signal and the fourth electrical signal, combining at least the first electrical signal, the second electrical signal, the third electrical signal, and the fourth electrical signal, to generate a combined electrical signal.

11. The method of claim 10, wherein:
   the first polarization is the same as the third polarization; and
   the second polarization is the same as the fourth polarization.

12. A method for wireless communication in a reflective environment, comprising:
   receiving first wireless signals at a first antenna assembly at least partially via a first reflective environment including a metal duct;
   generating a first electrical signal from a first antenna element of the first antenna assembly in response to the first wireless signals, the first antenna element having a first polarization;
   generating a second electrical signal from a second antenna element of the first antenna assembly, the second antenna element having a second polarization different from the first polarization; and
   generating the first wireless signals via a second antenna assembly.

13. The method of claim 12, further comprising controlling the second antenna assembly to adjust at least one of a phase and a magnitude of the first wireless signals.

14. A method for wireless communication in a reflective environment, comprising:
   receiving first wireless signals at a first antenna assembly at least partially via a first reflective environment including a metal duct;
   generating a first electrical signal from a first antenna element of the first antenna assembly in response to the first wireless signals, the first antenna element having a first polarization;
   generating a second electrical signal from a second antenna element of the first antenna assembly, the second antenna element having a second polarization different from the first polarization;
   receiving second wireless signals at a second antenna assembly at least partially via a second reflective environment;
   in response to the second wireless signals, generating a third electrical signal from a third antenna element of the second antenna assembly, the third antenna element having a third polarization; and
   in response to the second wireless signals, generating a fourth electrical signal from a fourth antenna element of the second antenna assembly, the fourth antenna element having a fourth polarization different from the third polarization.

15. The method of claim 14, further comprising shifting phase of at least one of the third electrical signal and the fourth electrical signal.

16. The method of claim 15, further comprising, after shifting phase of at least one of the third electrical signal and the fourth electrical signal, combining at least the third electrical signal and the fourth electrical signal to generate a combined electrical signal.

17. A method for wireless communication in a reflective environment, comprising:
   receiving first wireless signals at a first antenna assembly at least partially via a first reflective conduit;
   generating a first electrical signal from a first antenna element of the first antenna assembly in response to the first wireless signals, the first antenna element having a first polarization;
   after generating the first electrical signal from the first antenna element, shifting phase of the first electrical signal; and
   generating a second electrical signal from a second antenna element of the first antenna assembly, the second antenna element having a second polarization different from the first polarization.

* * * * *